United States Patent
Mach et al.

(10) Patent No.: US 7,719,705 B2
(45) Date of Patent: May 18, 2010

(54) METHOD, SYSTEM OF DEVICES AND COMPUTER FOR PROGRAMMES FOR GENERATING AND PROCESSING A DOCUMENT DATA STREAM CONTAINING STRUCTURED FIELDS

(75) Inventors: Cam-Hung Mach, Erding (DE); José La Rosa Ducato, Erding (DE)

(73) Assignee: Oce Printing Systems GmbH, Poing (DE)

( * ) Notice: Subject to any disclaimer, the term of this patent is extended or adjusted under 35 U.S.C. 154(b) by 930 days.

(21) Appl. No.: 10/504,576

(22) PCT Filed: Feb. 18, 2003

(86) PCT No.: PCT/EP03/01622

§ 371 (c)(1), (2), (4) Date: Apr. 18, 2005

(87) PCT Pub. No.: WO03/069548

PCT Pub. Date: Aug. 21, 2003

(65) Prior Publication Data

US 2005/0213139 A1    Sep. 29, 2005

(30) Foreign Application Priority Data

Feb. 18, 2002    (DE)    ............... 102 06 706

(51) Int. Cl.
  *G06F 3/12*    (2006.01)
  *G06F 15/16*    (2006.01)
(52) U.S. Cl. ............... 358/1.15; 358/1.9; 358/1.13; 358/1.16; 709/231; 709/234
(58) Field of Classification Search ............... 358/1.13, 358/1.18, 1.15, 1.16; 709/231, 234
See application file for complete search history.

(56) References Cited

U.S. PATENT DOCUMENTS

| | | | | |
|---|---|---|---|---|
| 4,649,513 A * | 3/1987 | Martin et al. | ............... | 715/210 |
| 4,651,278 A * | 3/1987 | Herzog et al. | ............... | 358/1.18 |
| 5,713,032 A | 1/1998 | Spencer | ............... | 715/209 |
| 5,717,922 A * | 2/1998 | Hohensee et al. | ............... | 707/100 |
| 5,727,220 A * | 3/1998 | Hohensee et al. | ............... | 715/234 |
| 5,768,488 A | 6/1998 | Stone et al. | ............... | 358/1.18 |
| 5,813,020 A * | 9/1998 | Hohensee et al. | ............... | 715/234 |
| 5,982,997 A | 11/1999 | Stone et al. | ............... | 358/1.15 |
| 6,010,261 A * | 1/2000 | Maekawa | ............... | 400/605 |
| 6,097,498 A * | 8/2000 | Debry et al. | ............... | 358/1.13 |
| 6,327,624 B1 * | 12/2001 | Mathewson et al. | ............... | 709/231 |
| 6,407,821 B1 * | 6/2002 | Hohensee et al. | ............... | 358/1.15 |

(Continued)

OTHER PUBLICATIONS

Architectures of Advanced Function Printing—deBry et al 8204 IBM Systems Journal 27 (1988) No. 2, Armonk, N.Y., USA.

(Continued)

*Primary Examiner*—Twyler L Haskins
*Assistant Examiner*—Dennis Dicker
(74) *Attorney, Agent, or Firm*—Schiff Hardin LLP

(57) ABSTRACT

In a method and system to generate a function presenting document data stream, at least one structured field is provided that comprises at least one data region. The structured field is provided with a padding region. Coded additional control data are stored in the padding region.

17 Claims, 3 Drawing Sheets

| Eye catcher | One or more Triplets | | | Padding Length | |
|---|---|---|---|---|---|
| 8 bytes | 2 bytes length | 2 Bytes ID | Data | 2 bytes length | 00 |
| 44 | 45 | 46 | 47 | 48 | 49 |

U.S. PATENT DOCUMENTS 6,992,785 B1 *  1/2006  Chatcavage et al. ........ 358/1.15
7,369,065 B2 *  5/2008  Mitchell et al. ............... 341/50

OTHER PUBLICATIONS

IBM Technical Disclosure Bulletin—vol. 32 No. 6A Nov. 1989.
IBM Technical Disclosure Bulletin vol. 40 No. 2 Feb. 1997.
Advanced Function Presentation IBM Programming Guide and Line Data Reference.
Data Stream and Object Architectures Mixed Object Document Content Architecture Reference.
Universal Printer Pre-and Post-Processing Interface Version 1.00 Oct. 2001.
Das Druckerbuch Technik und Technologien der Oce-Drucksysteme.

* cited by examiner

METHOD, SYSTEM OF DEVICES AND COMPUTER FOR PROGRAMMES FOR GENERATING AND PROCESSING A DOCUMENT DATA STREAM CONTAINING STRUCTURED FIELDS

BACKGROUND

The method and system concerns a method, a device system and a computer program to process a document data stream that comprises structured fields. A typical document data format of this type is the format AFP™ (Advanced Function Presentation). It is in particular used in electronic production printing environments, meaning in data processing and print systems that process the document data with a speed of up to a few thousand pages per minute.

Details of the document data stream AFP™ are specified in the publication Nr. F-544-3884-01, published by the company International Business Machines Corp. (IBM) with the title "AFP Programming Guide and Line Data Reference". The document data stream AFP was further developed into the document data stream MO:DCA, which is specified in the IBM publication SC31-6802-05 (April 2001) with the title "Mixed Object Document Content Architecture Reference". Details of this data stream, in particular the use of structured fields, are also specified in U.S. Pat. No. 5,768,488.

AFP/MO:DCA data streams are frequently converted into data streams of the Intelligent Printer Data Stream™ (IPDS™) in the course of print production jobs. Such a process is shown in U.S. Pat. No. 5,982,997.

To select various recording media, in the previously known AFP/IPDS architecture only the number of a feeder bay is specified ("Media Source ID" in the structured field "MMT") (see, for example, the pages 231-242 in the publication Nr. SC31-6802-05 cited above. With these methods, a physical feeder bay of a print device is selected by a print application but the type of the medium to be printed is not specified, such as, for example, specific pre-printed forms, transparent films, color paper, etc. that should be used for the application. Such fixed applications can only be used for a specific given print system and are dependent on setup adjustments of the print device. The problem thereby also exists that such fixed applications do not produce the expected results when they are sent to a different print system.

In the AFP data stream, what are known as map media type (MMT) structured fields are also provided (see publication Nr. SC31-6802-05 on pages 244-246). With them, it is possible in print applications to specify the print media to be used, respectively characterized by name or type designation. A control software to control a print device then checks which feeder bay in a print device contains the desired recording medium and selects the first coinciding bay for printing. Although this type of selection is already better than the above-cited print media selection referring to bay numbers, there are also limitations for this selection based on media name or media type: with regard to the media, predetermined names must be used in order to be recognized such that no unambiguous association can be made with regard to the media properties such as, for example, size, color or coating.

In the specification UP³I Universal Printer Pre- and Post-Processing Interface, Version 1.00 (October 2001), published by the companies Duplo International Ltd., Hunkeler A G, IBM Corporation [sic], Océ Printing Systems GmbH and Strålfors A B, which can be downloaded as a file at the Internet address www.up3i.org, codings for various features of recording media such as, for example, paper widths and lengths, paper coating specifications (matte, glossy), spec. weight, paper color, etc. can be selected on pages 49 through 54. It is thereby provided that such data can be exchanged between different devices of a print production system, thus, for example, between a paper dispenser device and a print device.

Various print data streams and print systems are, for example, specified in the publication "Das Druckerbuch", Dr. Gerd Goldmann (publisher), Océ Printing Systems GmbH, 6th edition (May 2001), ISBN 3-00-001019-x. The server system Océ PRISMApro is specified in chapter 14. This flexible print data server system is, for example, suited to transfer print data from data sources such as a source computer—the print data in a specific print data language such as AFP (Advanced Function Presentation), PCL (Printer Command Language), PostScript, SPDS (Siemens Print Data Stream), or in the language LCDS developed by the company Xerox Corporation—to a print production system.

In the specification and further development of print data streams, the problem sometimes exists that new commands must be inserted into the data stream in order to allow for the technical developments of computers, print devices and/or post-processing devices. The determination of such expansions is for the most part a relatively elaborate method in which various industry partners must cooperate in order to agree among one another on the changes or innovations. If new fields are arbitrarily assigned by a user of the data stream, on the one hand the problem exists that these fields cannot be recognized by other devices, and on the other hand that ambiguities occur, given a later common establishment of a similar or even an identical field, that hamper or make entirely impossible the correct processing of the data stream.

In U.S. Pat. No. 6,097,498, it is specified how three new data stream commands, namely WOCC, WOC as well as END are added to the Intelligent Printer Datastream™ (IPDS™).

A further possibility to store additional control data in an AFP data stream is to store data in object containers (see the pages 93-95 in the publication Nr. SC31-6802-05). Ultimately, such auxiliary control data can also be stored in the structured field "No operation" (NOP), which is virtually ignored by standard programs (what are known as parsers) for processing or interpretation of AFP print data streams. However, the previously cited possibilities have the disadvantage that AFP parsers in the interpretation of NOP fields are frequently not in a defined state, whereby interpretation errors can occur.

A method to generate a document data stream that comprises structured fields is known from U.S. Pat. No. 6,327,624 B1.

The publications cited above are herewith incorporated into the present specification by reference.

SUMMARY

It is an object to enable the addition of additional control data in an AFP print data stream that comprises at least one structured field without having to define new structured fields.

This object is achieved with a method and system to generate a function presenting document data stream wherein at least one structured field is provided that comprises at least one data region. The structured field is provided with a padding region. Coded additional control data are stored in the padding region.

DESCRIPTION OF THE PREFERRED EMBODIMENT

Figure 1:
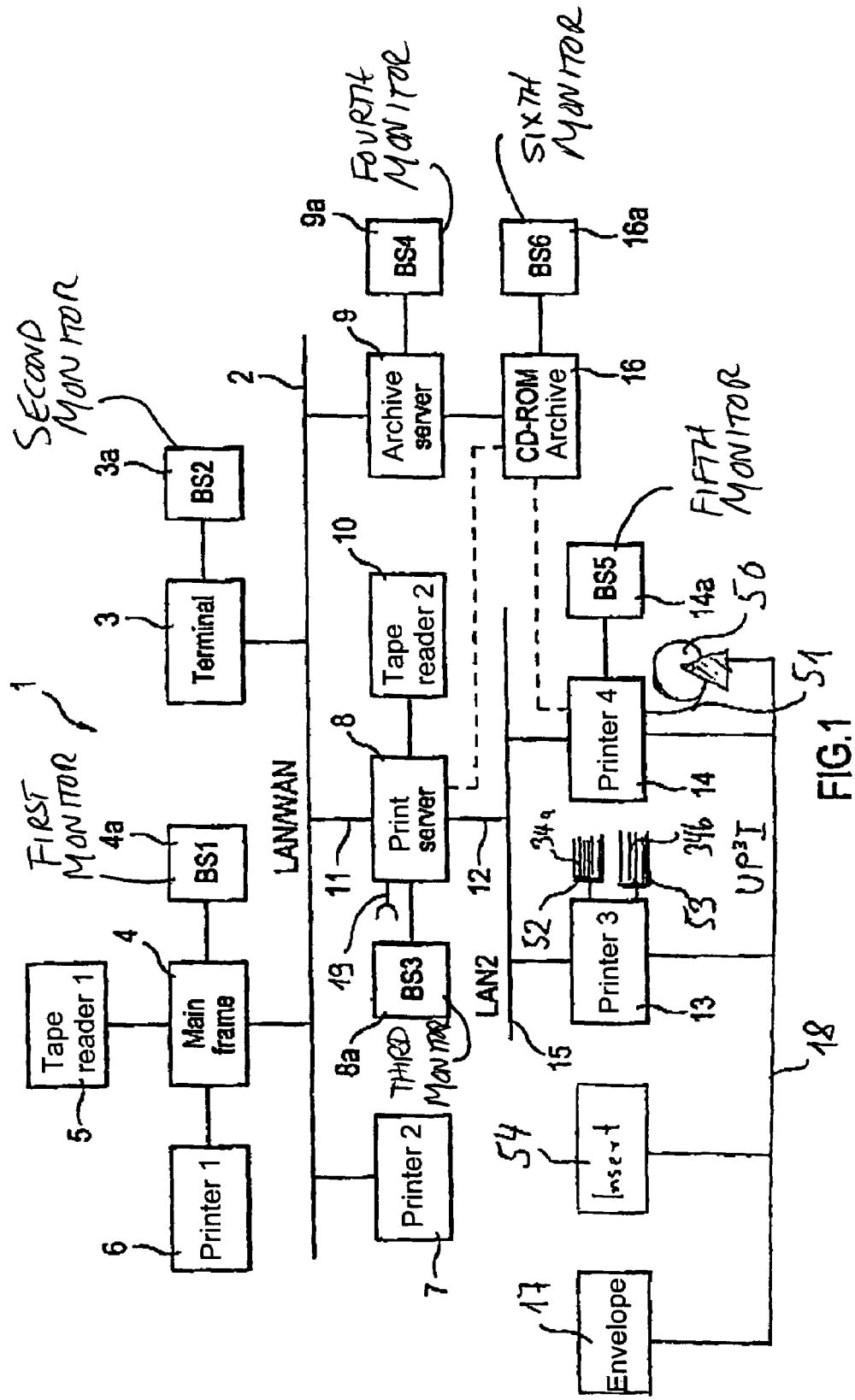
FIG. 1 shows a print production system.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

In a method to generate an AFP document data stream, at least one structured field in the AFP data stream is provided with a padding region, and additional control data are stored coded in the padding region.

In a method to interpret an AFP document data stream that comprises at least one structured field that comprises at least one data region and a padding region, it is checked whether additional control data are contained in the padding region. If necessary, the additional control data are read.

In a method to transfer the AFP document data from a data source to a data reception location, wherein the document data contain at least one structured field which comprises at least one data region and one padding region, additional control data are stored coded in the padding region, whereby using an identifier in an initial region of the padding region it is recognized whether additional data are contained in the padding region, and whereby in the case of the presence the data in the padding region are read.

In a method to select a print medium in a print system that comprises a plurality of media sources, in at least one structured field the print data stream comprises information about attributes of the recording medium material to be used, analyzes it before the beginning of the print event, and then (in particular using status messages of the print device and/or recording medium feed devices)

a) examines whether a recording medium is available that corresponds to all attributes determined in the data stream, and if necessary uses this recording medium for printing, b) otherwise checks whether a recording medium is available that is available with its original identifier number, insofar as such an identifier number was stated in the data stream, and if necessary this recording medium is taken into the print device for printing, c) when, in the preceding step, no medium was taken in, checks whether a medium is available whose name coincides with a possible media name specified in the print data stream, d) when the preceding step is also unsuccessful, checks whether in the print data stream an identification number for the medium or for a media input location coincides with a corresponding media or input location number of the print system, and if necessary this medium or this input location is selected, and e) when even the last cited search for a selection of a medium fails, in the print data stream an identifier (in particular a flag) is sought that specifies whether any available media source of the print system should be used or whether the print event should be aborted with an error message, and is correspondingly processed.

The padding region acts as a filler range, via which on the one hand different lengths of the data region can be compared, such that a predetermined overall field length can be achieved, and via which on the other hand control data can be stored coded in addition to the conventional data referring directly to the structured field. The defined filler region is additionally divided into an initial identifier region, a data region a remaining filler region. In the framework of the system and method, the further developed format MO:DCA™ from which the data stream IPDS™ is formed is also understood by the format AFP.

The provision of the structured field with the padding region occurs in particular according to the previously cited AFP specification in the manner specified there on pages 20 through 22, with a padding flag (PadFlag) in the Flag Zone and under establishment of the value "B1" in the FlagByte (padding data is present).

With the system and method, it is in particular possible to individually determine for each structured field whether a padding region is attached and, if necessary, how long this region should be. Furthermore, it can be established which type of control data are stored in the padding region. Given reading or, respectively, interpretation of the data, which type of control data is possibly stored in which type of structured field can then be stored in a correspondingly equipped parser, and thus an unambiguous retranslation of the data can ensue. In contrast to this, parsers that do not possess this information do not interpret the padding region, such that they behave neutrally and without problems with regard to the information stored there.

With regard to the previously cited expansion possibility of data in a No Operation field, the present system and method has the advantage that the control information housed in the padding region are housed in a region encapsulated according to AFP specification, and thus a very precise interpretation of the control information by an AFP parser is possible.

With regard to the previously cited expansion possibility of data streams (for example, new fields, object container order No Operation field), the present system and method furthermore provides that the additional control data can be stored in the filler region of that structured field in which data stand with which the additional control data are unambiguous associated. This means that the additional control data are stored precisely at the associated data fields with which they belong. Given later reading and interpretation of the data stream, the auxiliary control information can thus be read in immediate temporal proximity and thus be used without large storage expenditure. The later device control in which the data are to be read and evaluated is therefore made easier or improved.

For example, in the structured field "MMT" (Map Media Type) of the print data stream AFP, in addition to the bay number specified in the field further data about the output medium can be stored, for example page sizes or page coatings. The specifications about page sizes and page coatings are thus in the filler region of the structured field MMT and can thereby in particular be compliant with a different norm (relative to the data format AFP) such as, for example, the UP$^3$I specification likewise previously cited. For example, the additional control information can be specifications about the paper size (Paper Input Medianame Triplet), about the paper designation (Paper Input Medianame Subtriplet), about the paper coating (Paper Input Media Coding, Subtriplet) or other paper properties as is specified in the UP³I specification on pages 49 through 53.

In the method and system the knowledge is utilized that standard programs for processing of print data streams with structured fields, for example parsers for conversion of AFP print data stream into an IPDS print data stream, do not read or do not interpret the padding region of structured fields because this (according to the AFP specifications) are purely filler region that only serve to achieve a predetermined field length. The additional information can thus be quasi-hidden in the filler region (padding area), such that they are only read and/or evaluated by reader or interpreter programs specially designed for this.

In a further aspect of the system and method that can be viewed both in combination with and independent of the aspects of the system and method cited above, a print data stream that comprises in at least one item of structured field information about attributes of the recording medium material to be used is analyzed before the beginning of the print event. In particular using status messages of the print device and/or recording medium feeder devices, it is thereby checked whether a recording medium is available that corresponds to all attributes established in the data stream. This recording medium is, if necessary, used for printing. Otherwise, it is further checked whether a recording medium is available that is available with its original identifier number, insofar as such an identifier number was specified in the data stream. If no suitable print medium is also found, it is thus determined whether a medium is available whose name coincides with a possible media name specified in the print data stream, and this recording medium is, if necessary, used for printing. When this search is also unsuccessful, it is thus checked whether, in the print data stream, an identification number for the medium or for a media input location coincides with a corresponding media or input location number of the print system, and this medium or this input location is, if necessary, selected. When this search to select a medium also fails, in the print data stream an identifier, in particular a flag, is sought that specifies whether any available media source of the print system should be used and this media source is used if necessary, or whether the print event should be aborted with an error message "no suitable paper source".

The aspect of the system and method just now cited is in particular suitable for use in an AFP print data stream, whereby additional media-referring parameters or attributes that are checked in the first test step are preferably stored in the filler region of a media-referring structured AFP field such as, for example, a Medium Descriptor field (MDD), a Medium Modification Control field (MMC) or a Map Media Type field (MMT).

In FIG. 1, a high-capacity printing system 1 is shown in which various system components are connected over a data network 2, which can be a local network (Local Area Network, LAN) or can also be a larger network (Wide Area Network, WAN). At least one client terminal 3 is provided on which documents can be generated for forwarding and/or as print jobs. The terminal 3 is a known computer (for example, personal computer PC) with connected monitor 3a.

The documents or print jobs can thereby alternatively be generated by means of a data generation program on a main computer (main frame 4, or data can be inserted into the print job by the main frame 4. The main frame 4 of the computer center is controlled via a suitable operating system control such as MVS, BS2000 or VSE. Control functions and displays can occur on the main frame 4 via the connected monitor 4a. Moreover, a tape reader 5 as well as a first high-capacity printer 6 is directly connected to the main computer 4.

Moreover, a second printer 7, a print server 8 and an archive server 9 are connected to the data network 9. The print server 8 in turn is connected with a second tape reader device 10 as well as a monitor 8a. In addition to the connection 11 between the print server 8 and the main data network 2, the print server 8 is connected via the connection 12 with a second local network 15 to which further printers 13, 14 are connected. The printer 13 comprises two feeder bays 52, 53 in which paper pages 34a, 34b of various types are respectively situated. The print server 8 as well as the printer 14 can optionally be connected with a system for production of archive storage (CD-ROM) 16. However, the archive system 16 is mainly attached to the archive server 9. Additional monitors 9a, 16a and 14a, are connected with the respective devices 9, 16 and 14. Furthermore, the print server can also be connected (via an interface 19) with a global network (wide area network WAN, Internet) via which the document data or the print jobs are then supplied to other systems, for example document distribution, archive or print systems.

The printers 3, 4 are connected in a control-technical manner via the UP³I network 18 with print stock pre- and post-processing systems, namely with a winder 51, an inserter 55 and an enveloper 17. Further devices, for example page dispenser devices or cutting devices, binding devices or unrolling devices, could be connected to this network 18 as needed in just the same manner. They can exchange data according to the previously cited UP³I specification, which at this point is explicitly referred to. In particular, page dispenser devices or single-page printers are thereby in the position to identify the individual pages stored in their bays, meaning to communicate to all devices in the UP³I network 18 the page types with regard to the most varied parameters (in particular as specified in the UP³I specification under chapter 2.3.3 on the pages 49 through 53).

Figure 2:
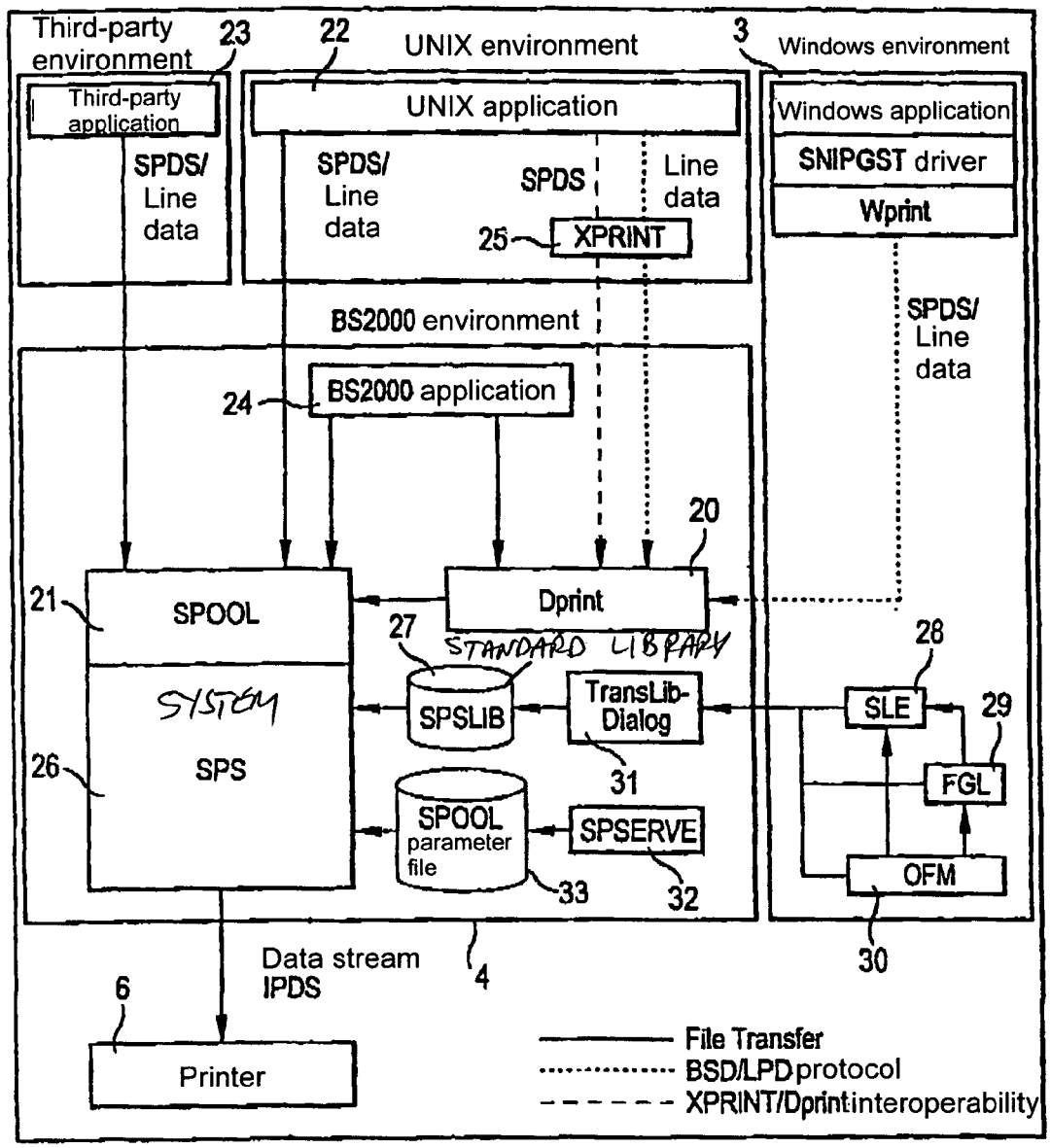
FIG. 2 illustrates a mainframe environment.

In FIG. 2, system components are specified that run within a Windows application in a terminal 3 and in a main frame 4 operating under the operating system BS2000. The IPDS data stream thereby generated is output to a printer, whereby instead of the printer 6 shown here one of the other printers 7, 13, 14, of FIG. 1 can be activated. Print files can be generated in a Windows environment in structured field format, whereby additional data, for example about the attributes of recording medium materials or about the type of the desired binding (spiral or glue binding), etc. can be inserted into structured fields corresponding to the filler region. The document data stream thereby formed in the format SPDS (Siemens Nixdorf Printer Data Stream) is conveyed to the print data spooler 21 via the function stage 20 (D-print). The spooler 21 can also accept direct line data or SPDS data from a Unix application 22 or another application 23 (for example, IBM), or from the operating system of the main frame 4 or receive and process direct line data from a corresponding application 24.

Print data that has been generated under the Unix application 22 can also be transferred to the BS2000 components 20 (D-print) via the system components 25 (X-print) and then supplied to the spooler 21.

With the system 26 (SPS), a standard library 27 (SPS LIB) is provided that comprises a number of standard print resources such as form definitions, page definitions, page segments and overlays. These library components are created in the Windows environment by means of the Windows applications 28 (Smart Layout Editor SLE), 29 (Form Generation Library) and 30 (Océ Font Manager OSM). Such created print resources are then provided to the BS2000 spool printer driver 26 (SPS spool print system) via the components 31 (Trans Lib Dialog) using the SPS library 27.

In order to introduce additional printer-adapted settings into the print data stream (print job) on a specific printer, spool parameters can also be designed as a file 33 via the system components 32 (SPSERVE). Such a parameter file can refer to the print setting, the printer definition or even to the print job itself and integrate corresponding data into the print data stream.

Instead of the operating system BS2000 shown in FIG. 2, the main frame can also be operated with another operating system suitable for a main frame, for example with the operating system MVS.

Figure 3:
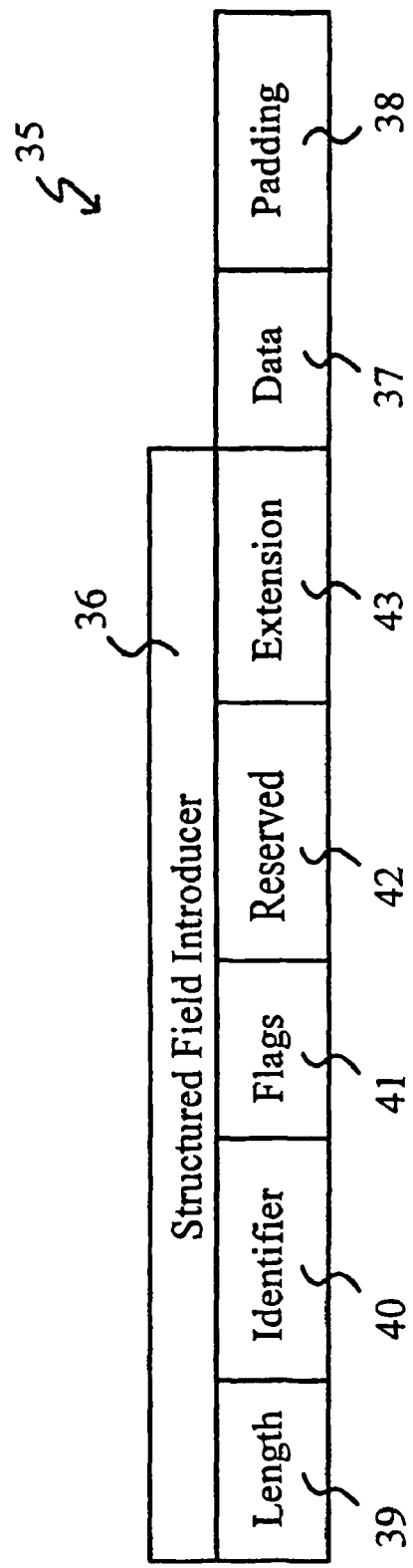
FIG. 3 illustrates the design of a structured data field.

FIG. 3 shows the design of a structured field according to page 20 of the previously cited IBM document Nr. SC31-6802-05 for AFP or, respectively, MO:DCA data streams. The structured field 35 can be split up into three parts, namely a first region 36 designated as a Structured Field Introducer, a data region 37 as well as a padding region 38, subsequently also called a filler region. While the insertion region 36 and the data region 37 are absolutely necessary for a structured field, the filler region 38 can be filled optionally. The insertion region 36 can in turn be divided into five sub-regions. In the length region 39, the complete length of the structured field 35 is specified, including the length of the insertion region 36. In the identification region 40, a three-byte code is stated with which the structured field can be unambiguously identified. Various identifier flags can be stored in the flag region 41, for example a segmentation flag that states whether the data of a structured field are segmented across a plurality of uniform fields; and a padding flag states whether the structured field 35 comprises filler data or not. The use of filler data (padding data) primarily lends itself when the structured fields of a document data stream should all have the respective same overall length. The present preferred embodiment uses such padding regions in order to store not only filler data, but rather control data as well that are in particular an expansion to the data stored in the data region 37.

According to AFP specification, no data should be stored in the reserved data region 42. In the extension region 43, the length of the subsequent data is stated, including the length of the extension region 43.

Figure 4:
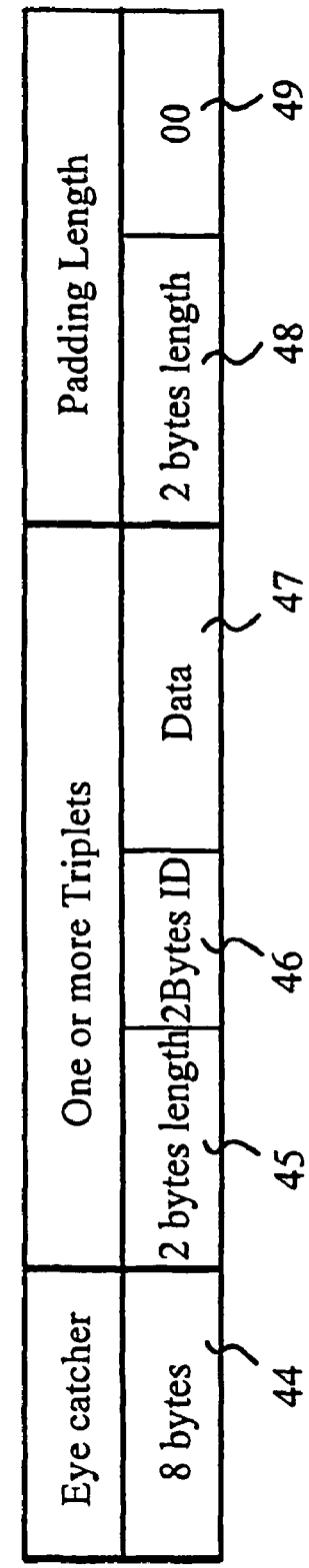
FIG. 4 illustrates the design of a filler region.

FIG. 4 shows the design of an inventive padding region 38 in which are comprised control data in addition to the data in the data region already shown in FIG. 3. In an eight-byte-long recognition field (eye catcher) 44, the signal "OxC1 C6 D7 E3 C9 C7 C5 D9" is stored in order to unambiguously identify the padding region as a region in which additional control information are stored. Standard AFP applications read no data whatsoever in this padding region since they assume that only filler bytes that carry no information are stored in this region. Directly after the identifier region 44, a two-byte-long item of information about the length of the subsequent data is stored in the length identification region 45. In the subsequent identity identification region 46 for the padding region 38, a two-byte-long item of information is stored in which the type (identifier) of the auxiliary control information is contained. The control data are stored in the control data region 47 in the form of triplets. In the region 48 the length of the remaining padding information, which is stored in the form of 0-information, is contained at the end of the padding region 38.

To read the auxiliary information from the filler region 38, a control program (computer software) is adjusted such that after reading the data region 37, the read event is not ended and jumped over the filler region 38, but rather the first eight bytes are read from the filler region 38. If identifier information (eye catcher) is found in this region, the control program jumps to the end of the filler region 38 and first reads from the end the filler data from the region 49 until it reaches the padding length region 48, in order to establish the length of the padding length region 48. With this information, it returns to the initial region 44 of the filler region 38 and the control triplet data are then read from the control data region 47.

The generation, processing and use of document data streams, in particular print data streams, in which additional control data are inserted into the filler regions of structured fields, is subsequently specified in the example of an AFP data stream, whereby additional control data characterizing the recording medium are inserted:

An AFP data generator creates a structured field of the type Map Media Type (MMT) and inserts a filler flag into its flag region 41, such that a filler region 38 (padding area) is formed in the MMT field. As shown in FIG. 4, in this padding area 38 an identifier is from now on inserted into the identifier region 44 and data are inserted into the remaining fields of the filler region 38, meaning into the regions 45, 46, 47, 48 and 49. Sub-triplet data are thereby generated in the data field 47 of the padding area 38 according to a predetermined specification, for example according to the previously cited UP$^3$I specification.

The subsequent two tables show possibilities for data that can be stored in the data field 47 when they refer to attributes of the recording medium materials:

TABLE 1

| Offset | Type | Name | Range | Meaning |
|---|---|---|---|---|
| 0-1 | UBIN | Tlength | 11-n | Triplet length |
| 2-3 | Code | TID | 0x7D01 | Media Attributes triplet |
| 4-7 | UBIN | MediaWidth | $0-(2^{32}-1)$ | Paper width in $1/7200$ inches |
| 8-11 | UBIN | MediaLength | $0-(2^{32}-1)$ | Paper length in $1/7200$ inches |
| 12-n | | Sub-triplets | | See UP$^3$I Paper Input Media subtriplets |

Table 1

They thereby mean:

T length: The length of a triplet

TID: The identifier for a media attribute triplet

Media Width: The physical width of a recording medium, whereby the value "0" means that an arbitrary length may be used Media Length: The physical length of a recording medium, whereby the value "0" means that an arbitrary length may be used Sub-triplets: If necessary, sub-triplets as they are defined in the UP$^3$I Paper InputMedium Triplet. Table 2 shows some of these sub-triplets.

TABLE 2

| Sub-triplet ID | Name | Description | | | |
|---|---|---|---|---|---|
| 0x03 | Input Media Brightness | Between 0 and $2^{16} - 1$ (specifies the Media reflectance percentage) | | | |
| 0x05 | Input Media Imagable Side | 0x01 front<br>0x03 both | | 0x02 back<br>0x04 none | |
| 0x06 | Input Media Color Name | 0x01 white<br>0x03 gray<br>0x05 yellow<br>0x07 blue<br>0x09 violet<br>0x0B brown<br>0x0D silver<br>0x0F pink<br>0x11 ivory | | 0x02 black<br>0x04 red<br>0x06 green<br>0x08 turquoise<br>0x0A orange<br>0x0C gold<br>0x0E nocolor<br>0x10 buff<br>0x12 goldenrod | |
| 0x07 | Input Media Ordered-Set Size | Between 1 and $2^{16} - 1$ (specifies the number of sheets in one set) | | | |
| 0x08 | Input Media Opacity | 0x01 opaque | | 0x02 transparent | |
| 0x09 | Pre-printed Input Media | 0x00 false | | 0x01 true | |
| 0x0A | Recycled Input Media | 0x00 false | | 0x01 true | |
| 0x0C | Input Media Thickness | Between 0 and $2^{32} - 1$ (specifies the Media thickness in microns μm) | | | |
| 0x0D | Input Media type | 0x01 continuous<br>0x03 continuous short<br>0x05 envelope plain<br>0x07 full cut tabs<br>0x09 letterhead<br>0x0B multi part form<br>0x0D pre cut tabs<br>0x0F tab stock | | 0x02 continuous long<br>0x04 envelope<br>0x06 envelope window<br>0x08 labels<br>0x0A multi layer<br>0x0C photographic<br>0x0E stationery<br>0x10 transparency | |
| 0x0E | Input Media weight | Between 0 and $2^{32} - 1$ (specifies the Media weight in g/m$^2$) | | | |
| 0x0F | Input Media Ordered-Set Piece | Between 1 and the value specified in the "Input Media Ordered Set Size" sub-triplet 0x07 (specifies the sheet number within set) | | | |

In the further processing of the document data stream, the document data stream is read and the AFP data necessary at the respective processing step and/or the data stored in the filler regions for control of devices is used. For example, in the course of the printout of documents, the MMT field cited above can be read and it can be recognized that additional control data are contained in its filler region 38. These control data are, as described further above, read beginning at the end, and then the data existing in the filler region 38 are compared with data which have been sent to the control program from an appropriate device such as, for example, a page insertion device (inserter), a paper drawing device and/or the print device. In particular data about available print media and its parameters or attributes (such as length, width, coating, weight, opacity or, respectively, transparency, color, etc.) are thereby checked. Depending on the test results, there are then the following possibilities:

a) In the event that the data (media attributes) read from the data stream coincide in all points with the data (media attributes) supplied by the device, exactly the desired print medium is available in the device. This medium is then used for printing. It can thereby be drawn, for example, as a paper page 34a from the feeder bay 52 or as a page 34b from the feeder bay 53 of the print device 3. However, it can also be supplied to the print device 4 by an external device such as, for example, from a winder 50 as a continuous paper web 51 or be supplied to the print device 3 by a paper dispenser device 54 (inserter bin) (see FIG. 1).

b) In the event that the complete agreement cited under a) is not present, it is checked whether a print medium is available in the print system that exactly corresponds with the object identification (object identifier (OID) specified in the AFP field MMT. If necessary, this print medium is used.

c) Should the steps a) and b) not lead to a page feed, it is attempted to find in the print system a medium that corresponds, with regard to the media type, to the media type specified in the MMT field. If necessary, this medium is used.

d) In the event that step c) is also unsuccessful, it is attempted to find in the print system a page feeder that, with regard to its identification number, coincides with the identification number located in the AFP print data stream, and if necessary a page is drawn from this page feed.

e) As a last attempt, it is checked whether the Media Fidelity Triplet has X'02' (Continue with default) in the AFP print data stream. If necessary, the print process is continued with the next found media source. When the triplet cited above has the value X'01', the print process is halted and an error message "no valid paper source" is generated.

According to the process cited above, it is assumed that the print system is already completely available for operation and that the best suitable print media is selected from the print media available in the print system. It can thereby additionally be provided that, in the framework of the comparisons cited above, in particular after the comparison a), a system message appears on a print server or on the control panel of a print device when precisely the desired print medium is not actually available. In such a case, the operator of a print device could thereby be made aware of which exact media types the print job requires, and he would have an opportunity to insert precisely this paper in the desired number of pages, for example in a special paper feed path. In the data stream itself, for this an additional flag could be provided that determines whether the processing process should be interrupted for this purpose (operating instruction) or whether it should proceed according to the points a) through d) cited above, via which the print process is not interrupted because no operator intervention is necessary.

In a print production environment, it is particularly advantageous to implement the selection of print media only "as needed" as a result of a medium map call. As already written above, it is thereby advantageous to execute the selection of the print medium in a series according to the level of detail, namely first according to the attributes, then according to the names, then according to the type and finally according to the number of the feeder bay in a paper feed device. Within a print file, one or more media map fields can thereby be called, whereby respectively a new check and media selection occurs. The call of a first medium map field normally occurs in an AFP print file after front and divider pages have been sent to the print device and before variable print data pages have been sent to the printer. The front and divider pages themselves can also thereby contain medium map fields.

Within a print production system, the following process has therefore proven to be advantageous:

Before a print job is sent to a printer or every time when the printer sends a message to the print server that changes specific setup states of the print device, in particular that have changed page feed parameters, a query is made by the control program of the print server to the printer as to which media or feed bays are now available. The information thereby received back is used in order to arrange within the print server a list with the available media, whereby their identification number or in particular the Paper Input Media Sub-Triplets specified according to $UP^3I$ are contained. The table is then sorted according to media source number in increasing order. To execute the print jobs, it is then initially checked whether a $UP^3I$-capable printer is connected at all. In the event that this is not the case, the additional control information describing media attributes are not used.

In the event that a print device supports the expanded control information ($Up^3I$ support) and has send corresponding signals to a print server, the media attribute triplet "0x7D01" is used in every attempt to use a media source, and the following process is run through:

1) in the data stream, all MMT-structured fields are identified and scanned, and a list is thereby created for the necessary media of the print job.

2) The media selection according is made according to the standard AFP rules for all media specifications located in the print job that exist without additional control information in the filler region.

3) For those media attributes in which auxiliary information exists, respectively the sub-triplets stored in the list "necessary media" are compared with the media properties specified in the list "available media". The first entry in the media list for which all necessary attributes coincide is then selected for the print event.

In this manner, all necessary media are searched and compared. In the event that no medium that coincides with the properties of the necessary medium is cited in the available medium list, the sequence a) through e) cited further above is continued, meaning first an exact AFP media designation is sought, then media type and finally any medium in the print system.

Although the method and system was largely specified using media attributes, it can also be used on additional control information of other structured fields of print data streams, in particular from AFP. As processing devices for the document data, not only can print systems with print devices and upstream pre- and post-processing devices be used, but rather other, in particular fully-electronic distribution systems for document data as well, for example e-mails systems, archiving systems, etc. Both web-shaped recording medium (fanfold recording media) and individual pages (cut sheet recording media) can be used as a medium.

The method and system can in particular be realized as a computer program (software). It can therewith be distributed as a computer program module, as a file on a data medium such as a diskette or CD-ROM, or as a file via a data or, respectively, communication network. Such and comparable computer program products or computer program elements are embodiments of the invention. The process can be applied in a computer, in a print device or in a print system with upstream or downstream data processing devices. It is thereby clear that corresponding computers on which the method and system is used can comprise further known technical devices such as input devices (keyboard, mouse, touchscreen), a microprocessor, a data or control bus, a display device (monitor, display) as well as a working storage, a fixed-disc storage and a network card.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

The invention claimed is:

1. A method to generate an advanced function presentation document data stream for a printer having a processor with software run on the processor for processing said data stream so that said printer can print documents based on said data stream, comprising the steps of:
   providing at least one advanced function presentation structured field that comprises a structured field introducer having a padding flag indicating whether the structured field comprises filler data or not, and at least one data region outside of the structured field introducer;
   providing the advanced function presentation structured field with a padding region also outside of the structured field introducer for storing said filler data, said padding region with the filler data being provided to achieve a predetermined overall field length for said structured field; and
   storing coded additional document printing control data used by the printer for printing said documents in the padding region.

2. A method according to claim 1 wherein the padding region is subdivided into at least two parts.

3. A method according to claim 2 wherein the padding region is subdivided into an initial identifier region, a data region, and a remaining padding region.

4. A method according to claim 1 wherein a printer data stream is generated.

5. A method according to claim 1 wherein the additional control data are stored in said structured field in which data exist with which the additional control data are associated.

6. A method according to claim 1 wherein the structured field comprises a map field.

7. A method according to claim 1 wherein an item of identifying information is stored in the structured field to which said data and padding regions are attached.

8. A method according to claim 1 wherein control data about an output medium are stored in the padding region.

9. A method according to claim 1 wherein said document printing control data corresponding to a printer processing interface specification are stored in the padding region.

10. A method according to claim 1 wherein the document printing control data in the padding region contain information about at least one of a length, a width, a surface coating, a color, a transparency, and a weight of a printing medium.

11. A method to interpret an advanced function presentation document data stream for a printer having a processor with software run on the processor for processing said data stream so that said printer can print documents based on said data stream, comprising the steps of:

providing at least one advanced function presentation structured field that comprises a structured field introducer with at least a padding flag indicating whether the structured field comprises filler data or not, at least one data region and a padding region outside of the structured field introducer for storing said filler data, said padding region with the filler data being provided to achieve a predetermined overall field length for said structured field;

checking whether additional document printing control data are contained in the padding region used by the printer for printing said documents by said printer; and reading the additional document printing control data if necessary for printing said documents by said printer.

12. A method to transfer advanced function presentation document data from a data source to a data reception location for a printer having a processor with software run on the processor for processing said data stream so that said printer can print documents based on said data stream, comprising the steps of:

providing the document data with at least one advanced function presentation structured field which comprises a structured field introducer with at least a padding flag indicating whether the structured field comprises filler data or not, and at least one data region and a padding region for storing said filler data, said padding region with the filler data being provided to achieve a predetermined overall field length for said structured field;

storing coded additional document printing control data used by the printer for printing said documents in the padding region; and using an identifier in an initial region of the padding region to recognize whether additional document printing control data are contained in the padding region, and if so, reading the additional control data in the padding region for printing said documents by said printer.

13. A method according to claim 12 wherein to read the padding region, a length of the padding region is first read at an end of the padding region from a length region field, and then the control data are reread from data fields of the padding region.

14. A document data processing system to generate an advanced function presentation document data stream, comprising:

a printer having a processor with software run on the processor for processing said data stream so that said printer can print documents based on said data stream;

at least one advanced function presentation structured field which comprises a structured field introducer having a padding flag indicating whether the structured field comprises filler data or not, and a plurality of data regions and a padding region for storing said filler data outside of the structured field introducer, said padding region with the filler data being provided to achieve a predetermined overall field length for said structured field; and coded additional control data being stored in the padding region.

15. A document data processing system to process an advanced function presentation document data stream, comprising:

a printer having a processor with software run on the processor for processing said data stream so that said printer can print documents based on said data stream;

at least one advanced function presentation structured field that comprises a structured field introducer having a padding flag indicating whether the structured field comprises filler data or not, and at least one data region and a padding region for said filler data outside of the structured field introducer, said padding region with the filler data being provided to achieve a predetermined overall field length for said structured field; and coded additional document printing control data used by the printer for printing said documents being stored in the padding region.

16. A document data processing system to process an advanced function presentation document data stream, comprising:

a printer having a processor with software run on the processor for processing said data stream so that said printer can print documents based on said data stream;

at least one advanced function presentation structured field that comprises a structured field introducer having a padding flag indicating whether the structured field comprises filler data or not, and at least one data region and a padding region outside of the structured field introducer for storing said filler data, said padding region with the filler data providing a predetermined overall field length for said structured field;

coded additional control data used by the printer for printing said documents stored in the padding region; and information from the data region and from the padding region being read and the read data being used to control a document output system of the printer.

17. A computer readable medium storing a computer program which at least one of generates, transfers, and interprets a data stream and generates an advanced function presentation document data stream for a printer having a processor with software run on the processor for processing said data stream so that said printer can print documents based on said data stream, comprising at least an advanced function presentation structured field that comprises a structured field introducer having a padding flag indicating whether the structured field comprises filler data or not, and at least one data region outside of the structured field introducer, the structured field being provided with a padding region also outside the structured field introducer for storing said filler data, said padding region with the filler data being provided to achieve a predetermined overall field length for said structured field, and stored coded additional document printing control data used by the printer for printing said documents in the padding region, and said program reading and using said document printing control data for said document printing.

* * * * *